(12) United States Patent
Munteanu et al.

(10) Patent No.: US 6,828,036 B1
(45) Date of Patent: Dec. 7, 2004

(54) ANTI-FERROMAGNETICALLY COUPLED MAGNETIC MEDIA WITH COMBINED INTERLAYER + FIRST MAGNETIC LAYER

(75) Inventors: Mariana Rodica Munteanu, Santa Clara, CA (US); Erol Girt, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/078,466

(22) Filed: Feb. 21, 2002

Related U.S. Application Data

(60) Provisional application No. 60/314,017, filed on Aug. 21, 2001.

(51) Int. Cl.[7] ............................................. G11B 5/66
(52) U.S. Cl. ..................... 428/611; 428/637; 428/671; 428/675; 428/678; 428/686; 428/216; 428/336; 428/694 TS; 428/694 TM
(58) Field of Search ................................. 428/611, 637, 428/671, 675, 678, 686, 216, 336, 694 TS, 694 TM, 213

(56) References Cited

U.S. PATENT DOCUMENTS

| | | | |
|---|---|---|---|
| 5,408,377 A | | 4/1995 | Gurney et al. |
| 5,598,308 A | | 1/1997 | Dieny et al. |
| 5,922,442 A | | 7/1999 | Lal et al. |
| 5,952,097 A | * | 9/1999 | Zhang ........................ 428/332 |
| 6,007,924 A | | 12/1999 | Lal et al. |
| 6,031,692 A | | 2/2000 | Kawawake et al. |
| 6,143,388 A | * | 11/2000 | Bian et al. ................. 428/65.3 |
| 6,280,813 B1 | * | 8/2001 | Carey et al. ............... 428/65.3 |
| 6,372,330 B1 | * | 4/2002 | Do et al. .................... 428/212 |
| 6,537,684 B1 | * | 3/2003 | Doerner et al. ............. 428/611 |
| 2002/0039668 A1 | * | 4/2002 | Inomata et al. ...... 428/694 TM |
| 2002/0071966 A1 | * | 6/2002 | Inomata et al. ...... 428/694 TM |

OTHER PUBLICATIONS

Inomata, A, Abarra, E., Acharya, B., Akimoto, H., and Okamoto, I., IEEE Trans. Mag., 37(4), 2001, 1449–1451.*
Acharya, B., Abarra, E., Okamoto, I., IEEE Trans. Mag., 37(4), 2001, 1475–1477.*

* cited by examiner

*Primary Examiner*—Kevin M. Bernatz
(74) *Attorney, Agent, or Firm*—McDermott Will & Emery LLP

(57) ABSTRACT

An anti-ferromagnetically coupled ("AFC"), high areal density magnetic recording medium of simplified thin film layer structure and having improved thermal stability and signal-to-medium noise ratio ("SMNR") comprises a stack of thin film layers including, in overlying sequence from a surface of a non-magnetic substrate:

(a) a non-magnetic seed layer ("SDL");
(b) at least one non-magnetic underlayer ("UL");
(c) a first ferromagnetic layer ("$M_1$");
(d) a non-magnetic spacer layer ("SPL"); and
(e) a second ferromagnetic layer serving as a magnetic recording layer ("$M_2$"); wherein:

the first ferromagnetic layer (c) serves as a combined interlayer ("IL") and "bottom" magnetic layer ("BML") and the non-magnetic spacer layer (d) provides RKKY-type coupling between the first ferromagnetic layer (c) and the second ferromagnetic layer (e) for stabilizing the medium via anti-ferromagnetic coupling (AFC) and improving the SMNR.

15 Claims, 4 Drawing Sheets

ANTI-FERROMAGNETICALLY COUPLED MAGNETIC MEDIA WITH COMBINED INTERLAYER + FIRST MAGNETIC LAYER

CROSS-REFERENCE TO PROVISIONAL APPLICATION

This application claims priority from U.S. provisional patent application Ser. No. 60/314,017 filed Aug. 21, 2001, the entire disclosure of which is incorporated herein by reference.

FIELD OF THE INVENTION

The present invention relates to very high areal density magnetic recording media, such as hard disks, which exhibit improved thermal stability, overwrite (OW) capability, and equalized signal-to-media noise ratio (SMNR), and to a method of manufacturing same. More particularly, the present invention relates to a simplified layer structure providing improved longitudinal magnetic recording media utilizing anti-ferromagnetic coupling (AFC) of vertically spaced-apart ferromagnetic layers.

BACKGROUND OF THE INVENTION

Magnetic recording ("MR") media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

A portion of a conventional longitudinal recording, thin-film, hard disk-type magnetic recording medium 1 of single magnetic layer constitution, such as commonly employed in computer-related applications, is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Adverting to FIG. 2, a recent approach for improving the microstructure, texture, and crystallographic orientation of magnetic alloys in the fabrication of thin film, high recording density, longitudinal magnetic recording media 1', involves modification of layer system 12 for microstructure control to include a third or "interlayer" 12C between underlayer 12B and magnetic recording layer 13. A number of Co-based alloy materials, such as CoCr, magnetic CoPtCr, CoPtCrTa, CoCrB, CoCrTa, and CoCrTaO$_x$ (where O$_x$ indicates surface-oxidized CoCrTa), etc., have been studied for use as intermediate layers 12C according to such approach, as disclosed in, for example, U.S. Pat. Nos. 5,736,262; 5,922,442; 6,001,447; 6,010,795; 6,143,388; 6,150,016; 6,221,481 B1; and 6,242,086 B1, the entire disclosures of which are incorporated herein by reference.

Magnetic media such as illustrated in FIG. 2 are advantageously fabricated with simultaneous crystallographic orientation and grain size refinement, by interposition of a "double underlayer" structure (equivalent to a structure represented as 12B$_1$/12B$_2$, wherein 12B$_1$ and 12B$_2$ respectively indicate first-deposited and second-deposited underlayers) between the substrate and the magnetic recording layer, e.g., a Cr/Cr$_{100-x}$V$_x$ or Cr/Cr$_{100-x}$W$_x$ double underlayer structure, with the Cr first underlayer (=12B$_1$) being deposited on the seed layer 12A.

One particular Co-based material suggested for use as interlayer 12C is CO$_{63-x}$Cr$_{37}$Pt$_x$, where x≦8, and a typical layer system 12 including such interlayer may be comprised of a seed layer 12A, e.g., of amorphous or fine-grained Ni—Al or Cr—Ti, an underlayer 12B, e.g., of a Cr/Cr$_{100-x}$W$_x$ double underlayer structure 12B$_1$/12B$_2$, such as Cr/Cr$_{90}$W$_{10}$, and an interlayer 12C, e.g., of CO$_{63-x}$Cr$_{37}$Pt$_x$, where x≦8.

While the above-described seed layer/underlayer/interlayer structures provide improvement in media performance, further efforts are continually being made with the aim of increasing the areal recording density, i.e., the bit density, or bits/unit area, thermal stability, signal-to-medium noise ratio ("SMNR"), and other properties/characteristics of high areal density magnetic media. However, severe difficulties are encountered when the bit density of longitudinal media is increased above about 20–50 Gb/in$^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the squareness of the magnetic bits, in order to compensate for the smaller grain sizes. However, this approach is limited by the field provided by the writing head.

Another proposed solution to the problem of thermal instability of very fine-grained magnetic recording media is to provide stabilization via coupling of the ferromagnetic recording layer with another ferromagnetic layer or an anti-ferromagnetic layer. In this regard, it has been recently proposed (E. N. Abarra et al., IEEE Conference on Magnetics, Toronto, April 2000) to provide a stabilized magnetic recording medium comprised of at least a pair of vertically spaced-apart ferromagnetic layers which are anti-ferromagnetically coupled ("AFC") by means of an interposed thin, non-magnetic spacer layer. The coupling is presumed to increase the effective volume of each of the magnetic grains, thereby increasing their stability. According to this approach, the coupling strength J between the ferromagnetic layer pairs is a key parameter in determining the increase in stability.

Recently, AFC-type, high areal density longitudinal media have been fabricated utilizing a layer system 12 similar to that described supra with respect to conventionally structured high areal density longitudinal media, i.e., comprised, in sequence, of a seed layer 12A, a double underlayer structure $12B_1/12B_2$, and an interlayer 12C, e.g., an amorphous or fine-grained Ni—Al or Cr—Ti seed layer 12A, a $Cr/Cr_{90}W_{10}$ double underlayer structure $12B_1/12B_2$, and a $CO_{63}Cr_{37}Pt_x$ interlayer 12C, where $x \leq 8$. Thus, an AFC-type, high areal density magnetic recording medium including such layer system 12 may be described by the following minimum 7-layer structure: non-magnetic substrate//seed layer ("SDL")//2 underlayers ("UL")// interlayer ("IL")//$1^{st}$ or "bottom" magnetic layer ("BML")// spacer layer for AFC ("SPL")//$2^{nd}$ or recording magnetic layer ("RML"). By way of illustration, an AFC medium comprising such minimum 7-layer structure is: Al—NiP substrate//Ni—Al or Cr—Ti seed layer//$Cr/Cr_{90}W_{10}$ double underlayer//$Co_{63-x}Cr_{37}Pt_x$ interlayer//$1^{st}$ magnetic layer $M_1$//Ru(Cr) spacer layer//$2^{nd}$ magnetic layer $M_2$.

Notwithstanding the improvement in performance of AFC media arising from the enhancements in microstructure, etc. afforded by the above-described seed layer/underlayer/interlayer system, further improvement of AFC media performance (e.g., SMNR) and a reduction in the number of requisite layers, e.g., magnetic layers, leading to increased manufacturing efficiency and cost-effectiveness, are desired.

Accordingly, there exists a need for improved methodology for providing thermally stable, high areal density anti-ferromagnetically coupled (AFC) magnetic recording media, e.g., longitudinal media, with simplified layer structures, i.e., a reduced number of magnetic layers, as well as improved thermal stability and recording characteristics, such as signal-to-media noise ratio (SMNR), overwrite capability (OW), etc., which methodology can be implemented at a manufacturing cost lower than that of conventional manufacturing technologies for forming high areal density AFC-type magnetic recording media comprising a greater number of magnetic layers. There also exists a need for improved, high areal density, AFC-type magnetic recording media, e.g., in disk form, which media include vertically spaced-apart, anti-ferromagnetically coupled ferromagnetic alloy layers separated by a non-magnetic spacer layer, wherein requisite number of magnetic layers is minimized and the media exhibits improved thermal stability and enhanced recording characteristics.

The present invention, therefore, facilitates cost-efficient manufacture of high areal recording density, thermally stable, high SMNR magnetic recording media, e.g., in the form of hard disks, which media utilize anti-ferromagnetic coupling (AFC) between vertically spaced-apart ferromagnetic layers for enhancing thermal stability, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is an improved anti-ferromagnetically coupled ("AFC"), high areal density magnetic recording medium of simplified thin film layer structure and having improved thermal stability and signal-to-medium noise ratio ("SMNR").

Another advantage of the present invention is a method of manufacturing an improved anti-ferromagnetically coupled ("AFC"), high areal density magnetic recording medium of simplified thin film layer structure and having improved thermal stability and signal-to-medium noise ratio ("SMNR").

Additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to one aspect of the present invention, the foregoing and other advantages are obtained in part by an anti-ferromagnetically coupled ("AFC"), high areal density magnetic recording medium of simplified thin film layer structure and having improved thermal stability and signal-to-medium noise ratio ("SMNR"), comprising a stack of thin film layers including, in overlying sequence from a surface of a non-magnetic substrate:

(a) a non-magnetic seed layer ("SDL");
(b) at least one non-magnetic underlayer ("UL");
(c) a first ferromagnetic layer ("$M_1$");
(d) a non-magnetic spacer layer ("SPL"); and
(e) a second ferromagnetic layer serving as a magnetic recording layer ("$M_2$"); wherein:
the first ferromagnetic layer (c) serves as a combined interlayer ("IL") and "bottom" magnetic layer ("BML") and the non-magnetic spacer layer (d) provides RKKY-type coupling between the first ferromagnetic layer (c) and the second ferromagnetic layer (e) for stabilizing the medium via anti-ferromagnetic coupling (AFC) and improving the SMNR.

According to embodiments of the present invention, the non-magnetic seed layer (a) is from about 10 to about 500 Å thick and comprises an amorphous or fine-grained material selected from the group consisting of Ni—Al, Fe—Al, Cr—Ti, Cr—Ta, Ta, Ta—W, Ru—Al, Co—Ti, and Ta—N; the at least one non-magnetic underlayer (b) is from about 30 to about 150 Å thick and comprises a polycrystalline material selected from Cr, Cr alloys, and $Cr/Cr_{100-x}M_x$ bi-layer structures, where M is a metal selected from W and V and $x \leq 15$, e.g., the at least one non-magnetic underlayer (b) is a $Cr/Cr_{90}W_{10}$ bi-layer structure; the first ferromagnetic layer (c) serving as a combined interlayer and "bottom" magnetic layer is from about 30 to about 50 Å thick and comprises a first CoCrPtB alloy, e.g., a $Co_{68+x+y}Cr_{16-x}Pt_{8-y}B_8$ alloy, wherein x=0–8 and y=0 or 1, or a CoCrTa alloy, e.g., $CoCr_{14}Ta_4$, and the first ferromagnetic layer (c) has a thickness less than that of the second ferromagnetic layer (e), the thickness of the first ferromagnetic layer (c) being sufficiently small such that at zero external field the magnetic moment thereof points in a direction opposite to the magnetic moment of the second ferromagnetic layer (e); the non-magnetic spacer layer (d) is from about 6 to about 15 Å thick and comprises a material selected from the group consisting of Ru, Rh, Ir, Cr, Cu, and their alloys, e.g., the non-magnetic spacer layer (d) comprises Ru or a Ru—Cr alloy; the second ferromagnetic layer (e) is from about 100 to about 250 Å thick and comprises one or more layers of at least one ferromagnetic material selected from alloys of Co with at least one element selected from the group consisting of Pt, Cr, B, Fe, Ta, Ni, Mo, V, Nb, W, Ru, and Ge.

In accordance with further embodiments of the present invention, the magnetic recording medium further comprises:

(f) a third ferromagnetic layer ("M$_3$") between the first ferromagnetic layer (c) and the non-magnetic spacer layer (d) for providing further improvement in equalized SMNR, the third ferromagnetic layer (f) being from about 20 to about 40 Å thick and comprising a second CoCrPtB alloy, e.g., a $Co_{66+x}Cr_{14-x}Pt_{10}B_{10}$, where x=0–8, and the combined thickness of the first ferromagnetic layer (c) and the third ferromagnetic magnetic layer (f) is less than that of the second ferromagnetic layer (e) and sufficiently small such that at zero external field the magnetic moments of both the first ferromagnetic layer (c) and the third ferromagnetic magnetic layer (f) point in a direction opposite to the magnetic moment of the second ferromagnetic layer (e).

According to particular embodiments of the present invention, the non-magnetic substrate comprises a material selected from among Al, Al-based alloys, NiP-plated Al, other metals, other metal alloys, glass, ceramics, polymers, and composites and laminates thereof; the non-magnetic seed layer (a) is from about 10 to about 500 Å thick and comprises an amorphous or fine-grained material selected from the group consisting of Ni—Al, Fe—Al, Cr—Ti, Cr—Ta, Ta, Ta—W, Ru—Al, Co—Ti, and Ta—N; the at least one non-magnetic underlayer (b) is from about 30 to about 150 Å thick and comprises a polycrystalline material selected from Cr, Cr alloys, and $Cr/Cr_{100-x}M_x$ bi-layer structures, where M is a metal selected from W and V and x≦15; the first ferromagnetic layer (c) serving as a combined interlayer and "bottom" magnetic layer is from about 30 to about 50 Å thick and comprises a $CO_{68+x+y}Cr_{16-x}Pt_{8-y}B_8$ alloy, wherein x=0–8 and y=0 or 1, or $CoCr_{14}Ta_4$; the non-magnetic spacer layer (d) is from about 6 to about 15 Å thick and comprises a material selected from the group consisting of Ru, Rh, Ir, Cr, Cu, and their alloys; and the second ferromagnetic layer (e) is from about 100 to about 250 Å thick and comprises one or more layers of at least one ferromagnetic material selected from alloys of Co with at least one element selected from the group consisting of Pt, Cr, B, Fe, Ta, Ni, Mo, V, Nb, W, Ru, and Ge, wherein the first ferromagnetic layer (c) has a thickness sufficiently small such that at zero external field the magnetic moment thereof points in a direction opposite to the magnetic moment of the second ferromagnetic layer (e).

In accordance with further particular embodiments of the present invention, the medium further comprises:

(f) a third ferromagnetic layer (M$_3$) comprising $Co_{66+x}Cr_{14-x}Pt_{10}B_{10}$, where x=0–8, between the first ferromagnetic layer (c) and the non-magnetic spacer layer (d) for providing further improvement in equalized SMNR, the third ferromagnetic layer (f) being from about 20 to about 40 Å thick, the combined thickness of the first ferromagnetic layer (c) and the third ferromagnetic magnetic layer (f) being less than that of the second ferromagnetic layer (e) and sufficiently small such that at zero external field the magnetic moments of both the first ferromagnetic layer (c) and the third ferromagnetic magnetic layer (f) point in a direction opposite to the magnetic moment of the second ferromagnetic layer (e).

According to another aspect of the present invention, a method of manufacturing an anti-ferromagnetically coupled ("AFC"), high areal density magnetic recording medium of simplified thin film layer structure and having improved thermal stability and signal-to-medium noise ratio ("SMNR"), comprising the steps of:

(a) providing a non-magnetic substrate including at least one surface; and (b) forming on the at least one surface a stack of thin film layers comprising, in sequence from the at least one surface:

(i) a non-magnetic seed layer ("SDL");
(ii) at least one non-magnetic underlayer ("UL");
(iii) a first ferromagnetic layer ("M$_1$")
(iv) a non-magnetic spacer layer ("SPL"); and
(v) a second ferromagnetic layer serving as a magnetic recording layer ("M$_2$");

wherein the first ferromagnetic layer (iii) serves as a combined interlayer ("IL") and "bottom" magnetic layer ("BMI,"), the non-magnetic spacer layer (iv) provides RKKY-type coupling between the first ferromagnetic layer (iii) and the second ferromagnetic layer (v) for stabilizing the medium via anti-ferromagnetic coupling (AFC) and improving the SMNR, and the first ferromagnetic layer (iii) has a thickness less than that of the second ferromagnetic layer (v), the thickness of the first ferromagnetic layer (iii) being sufficiently small such that at zero external field the magnetic moment thereof points in a direction opposite to the magnetic moment of the second ferromagnetic layer (v).

According to certain embodiments of the present invention, step (a) comprises providing a non-magnetic substrate comprising a material selected from among Al, Al-based alloys, NiP-plated Al, other metals, other metal alloys, glass, ceramics, polymers, and composites and laminates thereof; and step (b) comprises forming a stack of thin film layers comprising:

(i) a non-magnetic seed layer from about 10 to about 500 Å thick and comprised of an amorphous or fine-grained material selected from the group consisting of Ni—Al, Fe—Al, Cr—Ti, Cr—Ta, Ta, Ta—W, Ru—Al, Co—Ti, and Ta—N;

(ii) at least one non-magnetic underlayer from about 30 to about 150 Å thick and comprised of a polycrystalline material selected from Cr, Cr alloys, and $Cr/Cr_{100-x}M_x$ bi-layer structures, where M is a metal selected from W and V and x≦15;

(iii) a first ferromagnetic layer from about 30 to about 50 Å thick, serving as a combined interlayer and "bottom" magnetic layer and comprised of a $CO_{68+x+y}Cr_{16-x}Pt_{8-y}B_8$ alloy, wherein x=0–8 and y=0 or 1, or $CoCr_{14}Ta_4$;

(iv) a non-magnetic spacer layer from about 6 to about 15 Å thick and comprised of a material selected from the group consisting of Ru, Rh, Ir, Cr, Cu, and their alloys; and (v) a second ferromagnetic layer from about 100 to about 250 Å thick and comprised of one or more layers of at least one ferromagnetic material selected from alloys of Co with at least one element selected from the group consisting of Pt, Cr, B, Fe, Ta, Ni, Mo, V, Nb, W, Ru, and Ge.

According to further embodiments of the present invention, step (b) further comprises forming a third ferromagnetic layer (vi) comprising $Co_{66+x}Cr_{14-x}Pt_{10}B_{10}$, where x=0–8, between the first ferromagnetic layer (iii) and the non-magnetic spacer layer (iv) for providing further improvement in equalized SIMR, the third ferromagnetic layer (vi) being from about 20 to about 40 Å thick, the combined thickness of the first ferromagnetic layer (iii) and the third ferromagnetic magnetic layer (vi) being less than that of the second ferromagnetic layer (v) and sufficiently small such that at zero external field the magnetic moments of both the first ferromagnetic layer (iii) and the third ferromagnetic magnetic layer (vi) point in a direction opposite to the magnetic moment of the second ferromagnetic layer (v).

Yet another aspect of the present invention is an anti-ferromagnetically coupled ("AFC"), high areal density magnetic recording medium of simplified thin film layer structure and having improved thermal stability and signal-to-medium noise ratio ("SMNR"), comprising:

(a) a non-magnetic substrate; and
(b) means for providing a combined interlayer and bottom magnetic layer for a pair of anti-ferromagnetically coupled ferromagnetic layers.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition that improved high areal density, thin-film magnetic recording media, e.g., longitudinal recording media, having improved properties such as thermal stability, equalized SMNR, overwrite ("OW") capability, and pulse width at 50% of maximum amplitude ("PW$_{50}$"), can be reliably and controllably manufactured by providing a stacked multilayer, anti-ferromagnetically coupled ("AFC") structure having a simplified layer constitution vis-à-vis the conventional art. According to the invention, formation of AFC media with a simplified layer constitution is accomplished by providing a single magnetic layer which combines the functions of the heretofore separate (or distinct) interlayer and first or "bottom" ferromagnetic layer (which is anti-ferromagnetically coupled to a vertically spaced-apart second ferromagnetic or recording layer via a non-magnetic spacer layer to provide AFC-type recording media). A key feature of the present invention is the use of a first or "bottom" ferromagnetic layer which has a thickness less than that of the second, or magnetic recording layer, the thickness of the first ferromagnetic layer (c) being sufficiently small such that at zero external field the magnetic moment thereof points in a direction opposite to the magnetic moment of the second ferromagnetic layer.

The inventive methodology and simplified layer stack constitution affords several advantages not obtainable according to the conventional art for AFC recording media formation requiring a separate or distinct underlayer and first or "bottom" ferromagnetic layer, including, inter alia, ease and simplicity of manufacture of AFC-type longitudinal recording media having improved properties such as thermal stability, equalized SMNR, OW capability, and PW$_{50}$.

Figure 1:
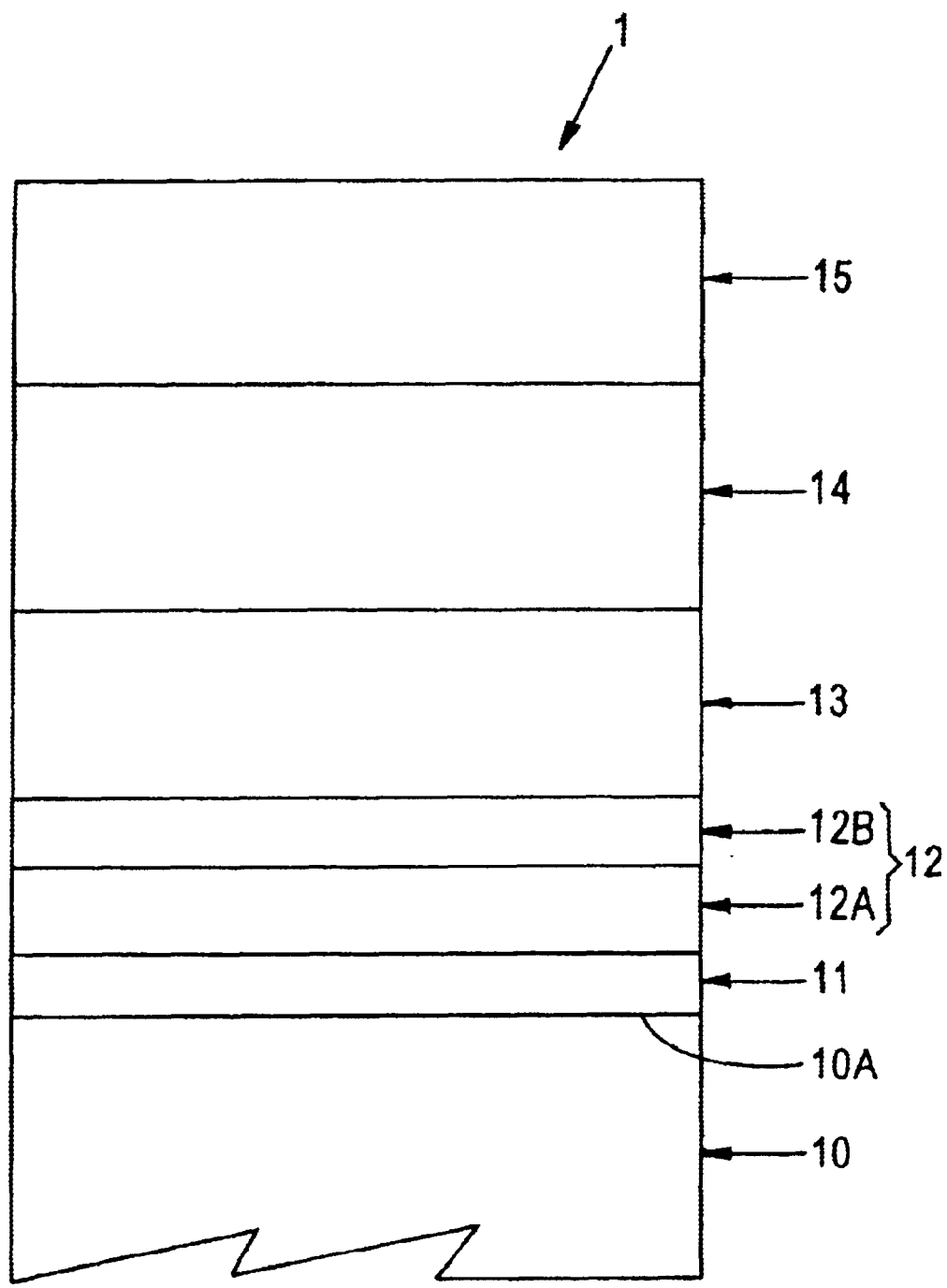
FIG. 1 schematically illustrates, in simplified, cross-sectional view, a portion of a conventional longitudinal magnetic recording medium.
Figure 2:
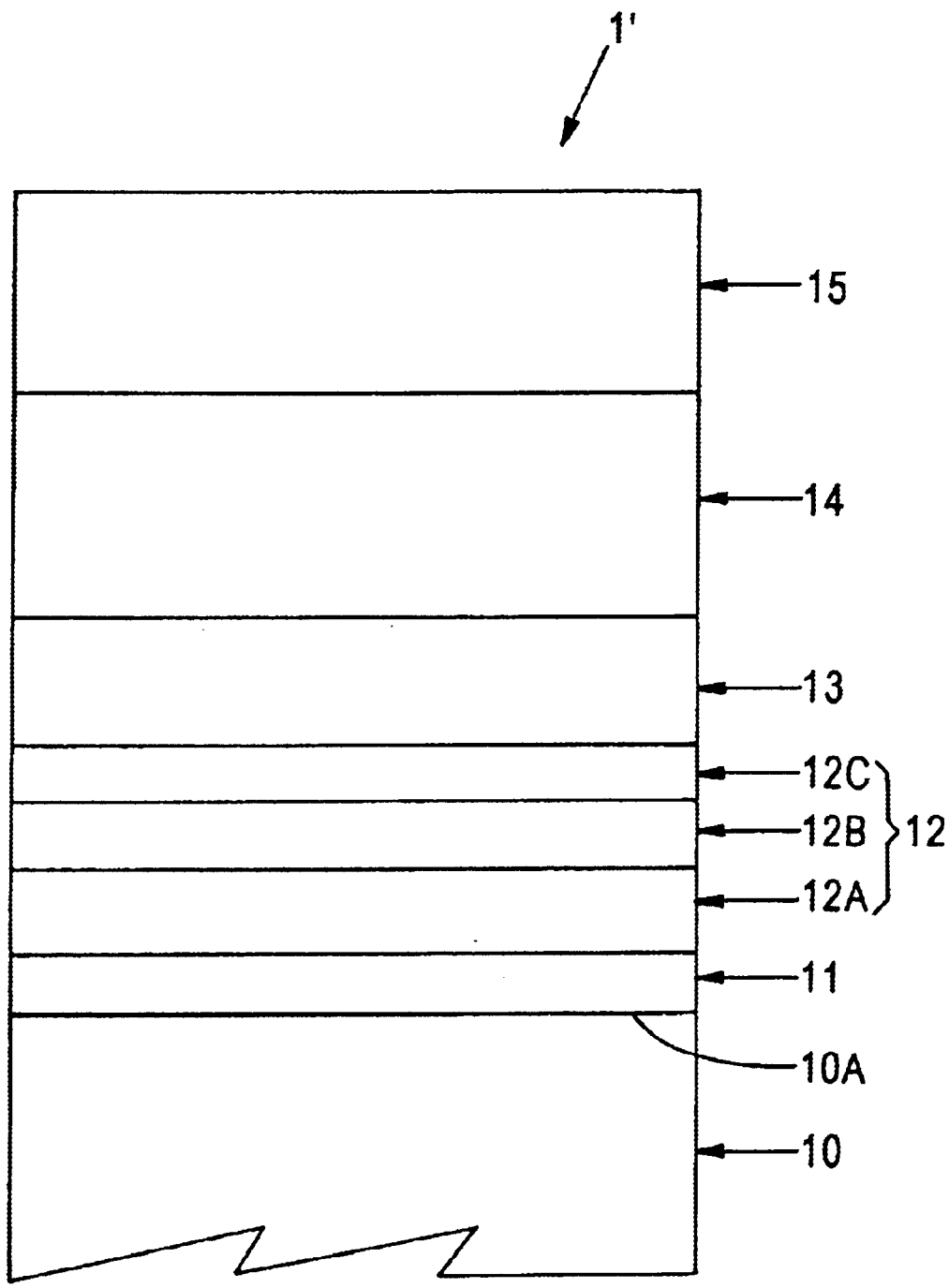
FIG. 2 schematically illustrates, in simplified, cross-sectional view, a portion of a conventional longitudinal magnetic recording medium according to FIG. 1 which has been modified to include an interlayer below the active magnetic recording layer.
Figure 3:
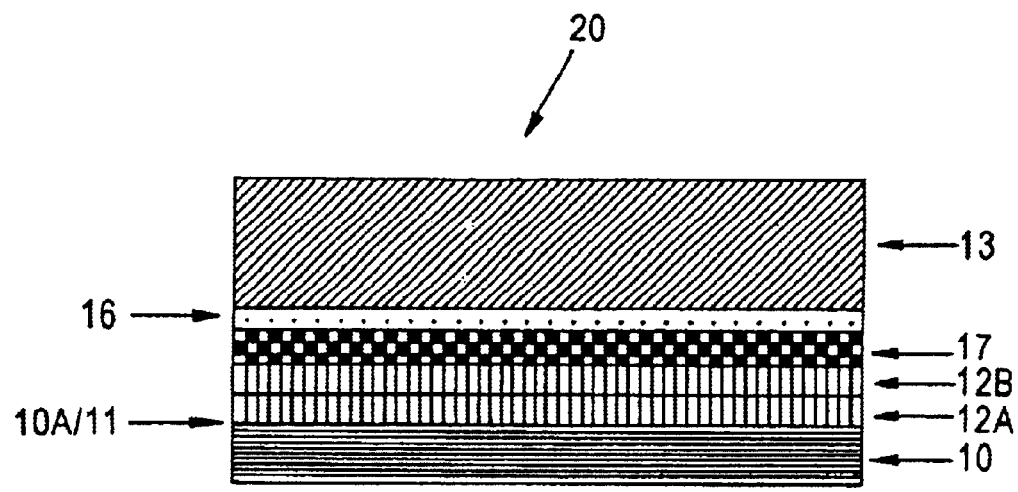
FIG. 3 schematically illustrates, in simplified, cross-sectional view, a portion of an embodiment of an anti-ferromagnetically (AFC) coupled magnetic recording medium according to the present invention.
Figure 4:
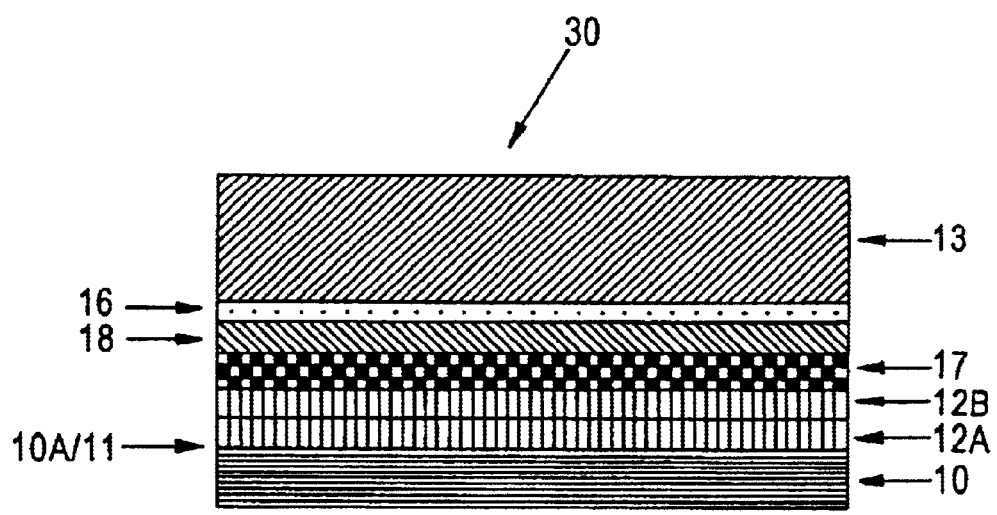
FIG. 4 schematically illustrates, in simplified, cross-sectional view, a portion of another embodiment of an anti-ferromagnetically (AFC) coupled magnetic recording medium according to the present invention.

FIGS. 3–4 schematically illustrate, in simplified cross-sectional view, embodiments of magnetic recording media embodying the inventive concept. An embodiment of a magnetic recording medium 20 according to the invention is shown in FIG. 3 and includes a non-magnetic substrate 10 selected from among non-magnetic metals and alloys, Al, Al-based alloys such as Al—Mg alloys, NiP-plated Al ("Al/NiP"), glass, ceramics, polymers, and composites and laminates of the aforementioned materials. The thickness of substrate 10 is not critical; however, in the case of magnetic recording media for use in hard disk applications, substrate 10 must be of a thickness sufficient to provide the necessary rigidity. When medium 20 takes the form of a hard disk, substrate 10 typically comprises Al or an Al-based alloy, e.g., an Al—Mg alloy, and includes on the surface 10A thereof a plating layer 11, e.g., a layer of amorphous NiP. Formed on the plating layer 11 is a seed layer 12A, for controlling the crystallographic texture and properties of ferromagnetic Co-based alloy layers deposited thereover, which seed layer 12A is comprised of an amorphous or fine-grained material, e.g., a Ni—Al, Fe—Al, Cr—Ti, Cr—Ta, Ta, Ta—W, Ru—Al, Co—Ti, or TaN layer from about 10 to about 500 Å thick. Overlying seed layer 12A is a non-magnetic, polycrystalline underlayer 12B, typically a Cr or Cr-based alloy layer (e.g., of Cr—W, Cr—Mo, CoCr, etc.), or a Cr/Cr$_{100-x}$M$_x$ bi-layer structure, where M is a metal selected from among W and V and x≦15, e.g., Cr/Cr$_{90}$W$_{10}$, which underlayer 12B typically is from about 30 to about 150 Å thick.

According to the present invention, single ferromagnetic layer 17 serving as a combined interlayer 12C+first or "bottom" ferromagnetic layer $M_1$ replaces the separate interlayer 12C and overlying first or "bottom" ferromagnetic layer ($M_1$) of the aforementioned layer structure for AFC-type high areal density magnetic recording media. Stated differently, and by way of illustration, according to the invention, an AFC-type longitudinal magnetic recording medium having a conventional layer structure constituted, in sequence, by a substrate, an amorphous or fine-grained Ni—Al or Cr—Ti seed layer 12A, a $Cr/Cr_{90}W_{10}$ double underlayer structure $12B_1/12B_2$, a $Co_{63-x}Cr_{37}Pt_x$ interlayer 12C, where $x \leq 8$, a first or "bottom" ferromagnetic layer $M_1$, a Ru-based non-magnetic spacer layer, and a second, or recording ferromagnetic layer ($M_2$) is modified to comprise a single layer 17 in the form of a crystalline first ferromagnetic layer combining the heretofore separate functions of interlayer 12C and first or "bottom" ferromagnetic layer $M_1$.

According to the invention, the crystalline first ferromagnetic layer 17, serving as a combined interlayer 12C and "bottom" magnetic layer ($M_1$) is from about 30 to about 50 Å thick and comprises a first CoCrPtB alloy or a CoCrTa alloy, e.g., a $CO_{68+x+y}Cr_{16-x}Pt_{8-y}B_8$ alloy, wherein $x=0$–8 and $y=0$ or 1, or $CoCr_{14}Ta_4$. Overlying and in contact with first ferromagnetic layer 17 is a thin, crystalline spacer layer 16 of a non-magnetic material selected to provide a large RKKY-type coupling effect, typically comprised of a material selected from the group consisting of Ru, Rh, Ir, Cr, Cu, and their alloys. By way of illustration, spacer layer 16 may comprise Ru or a Ru-based alloy, such as a $Ru_{100-\delta}Cr_\delta$, alloy, where $\delta$=from about 5 to about 30, from about 6 to about 15 Å thick, preferably from about 6 to about 10 Å thick.

Overlying and in contact with non-magnetic spacer layer 16 is a crystalline second ferromagnetic layer ($M_2$), 13 in FIGS. 3–4, from about 100 to about 250 Å thick, and comprised of a single layer or a plurality of sub-layers of at least one ferromagnetic material selected from alloys of Co with at least one element selected from the group consisting of Pt, Cr, B, Fe, Ta, Ni, Mo, V, Nb, W, Ru, and Ge. Completing the layer stack constituting medium 20 is a protective overcoat layer (not shown in FIGS. 3–4 for illustrative simplicity) in overlying contact with the second ferromagnetic layer ($M_2$), which protective overcoat layer typically comprises carbon (C), e.g., in the form of a diamond-like carbon ("DLC"), and a lubricant topcoat layer (also not shown in FIGS. 3–4 for illustrative simplicity) in overlying contact with the protective overcoat layer, e.g., a thin layer of a perfluoropolyether compound.

Each of the layers 12A, 12B, 17, 16, 13, as well as the protective overcoat layer constituting magnetic medium 20 of the present invention, may be deposited or otherwise formed by any suitable physical vapor deposition technique (PVD), e.g., sputtering, or by a combination of PVD techniques, i.e., sputtering, vacuum evaporation, etc. The lubricant topcoat layer is typically provided over the upper surface of the protective overcoat layer in conventional fashion, e.g., as by dipping of the medium into a bath containing a solution of the lubricant compound, followed by removal of excess liquid, as by wiping.

A key feature for obtaining the improved performance provided by the AFC-type media of the present invention is formation of the first ferromagnetic layer 17 with a thickness less than that of the at least one second ferromagnetic layer 13, the thickness of the first ferromagnetic layer 17 being selected to be sufficiently thin such that at zero external field the magnetic moment thereof points in a direction opposite to the magnetic moment of the second ferromagnetic layer 13.

Referring now to FIG. 4, shown therein is another embodiment of the present invention, which is similar in all respects to the embodiment shown in FIG. 3, but for inclusion of an additional, i.e., third crystalline ferromagnetic layer ($M_3$), 18 in FIG. 4, between the first ferromagnetic layer 17 and the non-magnetic spacer layer 16 for providing a further improvement in equalized SMNR. By way of illustration, layer 18 may comprise an about 20 to about 40 Å thick layer of a second CoCrPtB alloy, i.e., of a composition different from that of the first CoCrPtB alloy utilized for the first ferromagnetic layer 17, e.g., $Co_{66+x}Cr_{14-x}Pt_{10}B_{10}$, where $x=0$–8.

In this instance, a key feature for obtaining the improved performance provided by the AFC-type media of the present invention is formation of media wherein the combined thickness of the first ferromagnetic layer 17 and the third ferromagnetic magnetic layer 18 is less than that of the second ferromagnetic layer 13, the thickness of each of layers 17 and 18 and/or their combined thickness being sufficiently thin such that at zero external field the magnetic moments of both the first ferromagnetic layer 17 and the third ferromagnetic magnetic layer 18 point in a direction opposite to the magnetic moment of the second ferromagnetic layer 13.

Guzik data for AFC-type longitudinal media having the following layer structures. $UL/IL/M_1/SPL/M_2$ and $UL/IL+M_1/SPL/M_2$ (where $IL+M_1$=17); and for conventional high areal density single layer (SL) longitudinal media are presented below in Table 1, wherein the different CoCrPtB alloy compositions for the first ferromagnetic layer $M_1$ are indicated in terms of the Cr, Pt, and B contents and SPL=Ru(Cr) in each instance.

TABLE I

| Layer Structure | Cr/Pt/B | $H_{cr}$ [Oe] | $M_r t$ [memu/cm³] | S* | $M_r t/H_{cr}$ [nm] | eSMNR [dB] | $PW_{50}$ [µin.] | OW [dB] |
|---|---|---|---|---|---|---|---|---|
| $UL/IL/M_1/SPL/M_2$ | 22/12/6 | 5367 | 0.31 | 0.84 | 7.2 | −0.7 | 3.9 | 34.8 |
| $UL/IL/M_1/SPL/M_2$ | 8/7/8 | 5065 | 0.31 | 0.85 | 7.7 | −0.9 | 4.0 | 37.1 |
| $UL/IL/M_1/SPL/M_2$ | 15/12/12 | 4900 | 0.31 | 0.80 | 7.9 | −0.8 | 4.0 | 37.3 |
| $UL/IL/M_1/SPL/M_2$ | 10/10/16 | 5048 | 0.30 | 0.83 | 7.4 | −0.7 | 4.0 | 37.0 |
| $UL/IL + M_1/SPL/M_2$ | 8/7/8 | 4764 | 0.32 | 0.86 | 8.4 | 1.4 | 4.0 | 35.1 |
| $UL/IL + M_1/SPL/M_2$ | 8/7/8 | 4840 | 0.28 | 0.87 | 7.3 | 1.5 | 3.9 | 36.7 |
| SL (40 Gb/in²) | | 4407 | 0.42 | 0.87 | 12.1 | 1.0 | 4.2 | 34.5 |

As is evident from the data of Table 1, the largest value of eSMNR is obtained when the separate IL/ML layer structure is replaced with a combined $IL+M_1$ first magnetic layer structure corresponding to layer 17 with an alloy composition of $CO_{68+x+y}Cr_{16-x}Pt_{8-y}B_8$ alloy, wherein $x=0$–8 and $y=0$ or 1, e.g., $CO_{74}Cr_8Pt_8B_8$. In addition, the values of $PW_{50}$ and OW for such media are equal to or better than those of the conventional high areal density single layer (SL) media and are similar to those of the AFC media with the separate IL/$M_1$ layer constitution.

Transmission electron microscopy (TEM) images of the microstructures of the top, or second ferromagnetic layer $M_2$ of AFC-type media with combined (IL+$M_1$) and separate (IL/$M_1$) layer structures indicated that the top or second ferromagnetic layer $M_2$ of AFC-type media with the combined (IL+$M_1$) layer structure according to the invention has a smaller average grain size, $D_{av}$, of about 9 nm and narrower grain size distribution σ CT of about 2.6, compared to that of the AFC media with separate (IL/$M_1$) layer structure, i.e., about 9.7 nm and 3.5, respectively. In addition, X-ray diffraction studies have indicated better alignment of the c-axis of the top or second ferromagnetic layer $M_2$ along the film plane for AFC media with the combined (IL+$M_1$) layer structure according to the invention. It is considered that both the smaller grain size and improved in-plane orientation of the c-axis of the top or second ferromagnetic layer $M_2$ of AFC-type media with the combined (IL+$M_1$) layer structure according to the invention may be responsible for the better recording properties of the inventive media.

Figure 5:
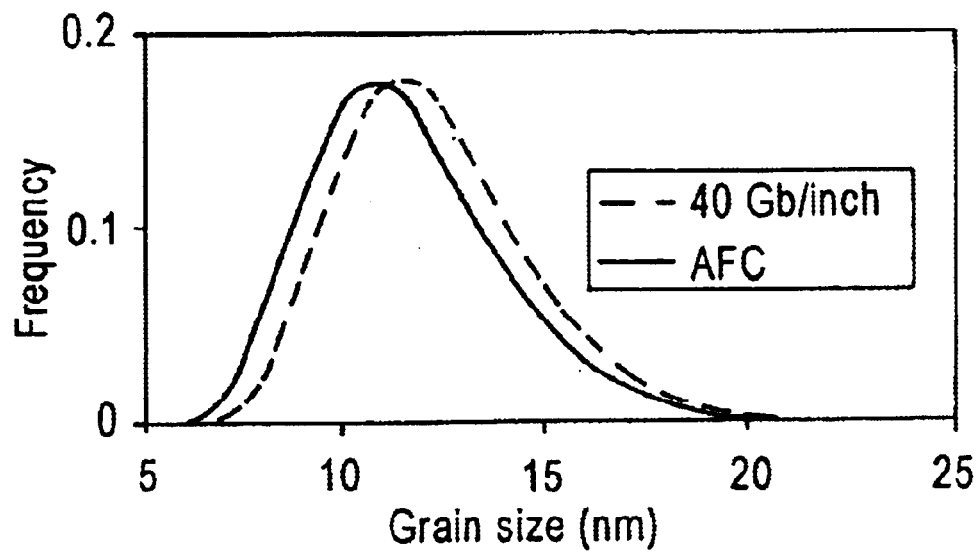
FIG. 5 is a graph for comparing the grain size and grain size distribution for single layer 40 Gb/in$^2$ longitudinal magnetic recording media having an underlayer/interlayer/magnetic recording layer structure according to the conventional art and for AFC media having an underlayer/combined interlayer+bottom magnetic layer/non-magnetic spacer layer/magnetic recording layer structure according to the present invention.

Transmission electron microscopy ("TEM") has also been used to investigate and compare the microstructures of AFC media with the combined (IL+$M_1$) layer structure (UL/8-7-8/Ru(Cr)/$M_2$) according to the invention and conventional 40 Gb/in$^2$ single layer (SL) media having a layer structure of UL/8-7-8/M. The results of such studies are graphically presented in FIG. 5, wherein the top magnetic layer $M_2$ of the AFC media according to the present invention exhibit a smaller grain size ($D_{av}$=9.1 nm) and narrower size distribution (σ=2.6) than layer M in the SL media ($D_{av}$=9.8 nm and σ=2.8).

Figure 6:
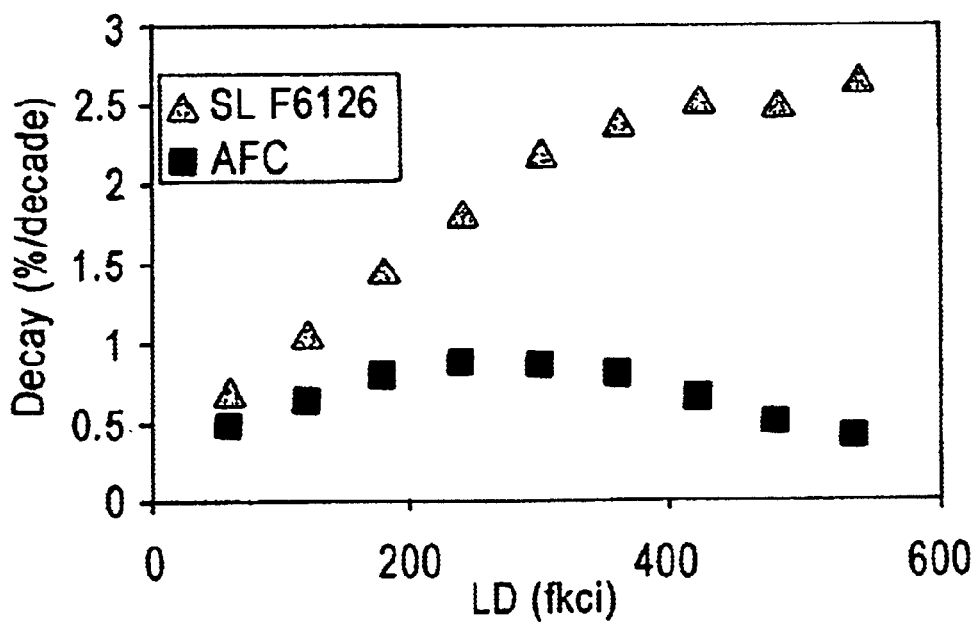
FIG. 6 is a graph for comparing decay data for single layer 40 Gb/in$^2$ longitudinal magnetic recording media having an underlayer/interlayer/magnetic recording layer structure according to the conventional art and for AFC media having an underlayer/combined interlayer+bottom magnetic layer/non-magnetic spacer layer/magnetic recording layer structure according to the present invention.

FIG. 6 graphically compares decay data for single layer 40 Gb/in$^2$ longitudinal magnetic recording media of layer structure UL/8-7-8/M according to the conventional art and for AFC media having a UL/8-7-8/Ru(Cr)/$M_2$ layer structure according to the present invention. As is evident from FIG. 6, the AFC media according to the present invention is more stable than the conventional single layer (SL) media even though it has smaller grains. The reduced grain size can be reflected in improved eSMNR of the inventive AFC media.

Referring now to the Guzik data of Table II below, it is seen that insertion of an additional ferromagnetic layer ($M_3$), e.g., a $CO_{70}Cr_{10}Pt_{10}B_{10}$ layer, between the combined IL+$M_1$ layer of the invention and the Ru(Cr) non-magnetic spacer layer (SPL) results in a further improvement in equalized SMNR.

In addition, X-ray diffraction studies have indicated that broadening of the peak, W, as obtained from an Omega scan, increases slightly (from 5.56 to 5.72 degrees) when a $CO_{70}Cr_{10}Pt_{10}B_{10}$ layer ($M_3$) is introduced between the combined IL+$M_1$ layer and the Ru(Cr) spacer layer, indicating that the UL/$CO_{77}Cr_8Pt_7B_8$/Ru(Cr)/$M_2$ structure has a slightly better in-plane orientation of the c-axis than the UL/$CO_{77}Cr_8Pt_7B_8$/$CO_{70}Cr_{10}Pt_{10}B_{10}$/Ru(Cr)/$M_2$ structure. However, the orientation ratio ("OR"), i.e., $M_0/M_1$ improves from 1.42 to 1.49 when the $CO_{70}Cr_{10}Pt_{10}B_{10}$ layer ($M_3$) is introduced between the combined IL+$M_1$ layer and the Ru(Cr) spacer layer. These results suggest that the benefit from the improved OR is more important for improving the eSMNR of AFC media.

Thus, it has been demonstrated that superior recording properties and microstructure in AFC media can be obtained with less magnetic layers by utilizing a UL/combined IL+$M_1$ layer configuration, e.g., a UL/$Co_{68+x+y}Cr_{l6-x}Pt_{8-y}B_8$/Ru(Cr)/$M_2$ configuration, wherein x=0–8 and y=0 or 1, or a UL/$CoCr_{14}Ta_4$/Ru(Cr)/$M_2$ configuration instead of a UL/$CO_{63-x}Cr_{37}Pt_x$ (x≦8)/$M_1$/Ru(Cr)/$M_2$ structure, where UL=Cr/$Cr_{90}W_{10}$. Moreover, an further improvement in equalized SMNR can be obtained by introducing an additional $CO_{66+x}Cr_{14-x}Pt_{10}B_{10}$, x=0–8 ferromagnetic layer between the combined IL+$M_1$ layer and the Ru(Cr) non-magnetic spacer layer.

The present invention thus advantageously provides high quality, thermally stable, high areal recording density magnetic recording media, which media achieve improved thermal stability, overwrite capability, and equalized SMNR via a single ferromagnetic layer functioning as both an interlayer and a first, or "bottom" magnetic layer for anti-ferromagnetic coupling with at least one second, or top, ferromagnetic layer for forming AFC media. Moreover, the inventive methodology can be practiced in a cost-effective manner, utilizing conventional manufacturing technology and equipment (e.g., sputtering technology and equipment) for automated, large-scale manufacture of magnetic recording media, such as hard disks. Finally, the invention is not limited to use with hard disks, but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled ("AFC") magnetic recording medium comprising a stack of thin film layers including, in overlying sequence from a surface of a non-magnetic substrate:

TABLE II

| Layer Structure | Cr/Pt/B | $H_{cr}$ [Oe] | $M_r t$ [memu/cm$^3$] | S* | $M_r t/H_{cr}$ [nm] | eSMNR [dB] | $PW_{50}$ [μin.] | OW [dB] |
| --- | --- | --- | --- | --- | --- | --- | --- | --- |
| UL/IL + $M_1$/$M_3$/SPL/$M_2$ | 8/7/8 + 10/10/10 | 4798 | 0.40 | 0.88 | 10.35 | 1.0 | 3.9 | 34.2 |
| UL/IL + $M_1$/SPL/$M_2$ | 8/7/8 | 4904 | 0.39 | 0.90 | 9.97 | 0.2 | 3.9 | 37.1 |
| SL (40 Gb/in$^2$) | | 4407 | 0.42 | 0.87 | 12.1 | 0.0 | 4.2 | 34.5 |

(a) a non-magnetic seed layer ("SDL");

(b) at least one non-magnetic underlayer ("UL");

(c) a first ferromagnetic layer ("$M_1$") positioned directly on said non-magnetic underlayer (b), said first ferromagnetic layer (c) is from about 30 to about 50 Å thick and comprises a $Co_{68+x+y}Cr_{16-x}Pt_{8-y}B_8$ alloy wherein x=0–8 and y=0 or 1, or $CoCr_{14}Ta_4$;

(d) a non-magnetic spacer layer ("SPL");

(e) a second ferromagnetic layer serving as a magnetic recording layer ("$M_2$"); and (f) a third ferromagnetic layer ("$M_3$") positioned directly between said first ferromagnetic layer (c) and said non-magnetic spacer layer (d); wherein:

the combined thickness of said first ferromagnetic layer (c) and said third ferromagnetic magnetic layer (f) being less than that of said second ferromagnetic layer (e) and sufficiently small such that at zero external field the magnetic moments of both said first ferromagnetic layer (c) and said third ferromagnetic magnetic layer (f) point in a direction opposite to the magnetic moment of said second ferromagnetic layer (e).

2. The magnetic recording medium as in claim 1, wherein: said non-magnetic seed layer (a) is from about 10 to about 500 Å thick and comprises an amorphous or fine-grained material selected from the group consisting of Ni—Al, Fe—Al, Cr—Ti, Cr—Ta, Ta, Ta—W, Ru—Al, Co—Ti, and Ta—N.

3. The magnetic recording medium as in claim 1, wherein: said at least one non-magnetic underlayer (b) is from about 30 to about 150 Å thick and comprises a polycrystalline material selected from Cr, Cr alloys, and $Cr/Cr_{100-x}M_x$ bi-layer structures, where M is a metal selected from W and V and $x \leq 15$.

4. The magnetic recording medium as in claim 3, wherein: said at least one non-magnetic underlayer (b) is a $Cr/Cr_{90}W_{10}$ bi-layer structure.

5. The magnetic recording medium as in claim 1, wherein: said non-magnetic spacer layer (d) is from about 6 to about 15 Å thick and comprises a material selected from the group consisting of Ru, Rh, Ir, Cr, Cu, and their alloys.

6. The magnetic recording medium as in claim 5, wherein: said non-magnetic spacer layer (d) comprises Ru or a Ru—Cr alloy.

7. The magnetic recording medium as in claim 1, wherein: said second ferromagnetic layer (e) is from about 100 to about 250 Å thick and comprises one or more layers of at least one ferromagnetic material selected from alloys of Co with at least one element selected from the group consisting of Pt, Cr, B, Fe, Ta, Ni, Mo, V, Nb, W, Ru, and Ge.

8. The magnetic recording medium as in claim 1, wherein: said third ferromagnetic layer ("$M_3$") further providing improvement in equalized SMNR.

9. The magnetic recording medium as in claim 8, wherein: said third ferromagnetic layer (f) is from about 20 to about 40 Å thick and comprises a CoCrPtB alloy.

10. The magnetic recording medium as in claim 9, wherein: said CoCrPtB alloy of said third ferromagnetic layer (f) comprises $Co_{66+x}Cr_{14-x}Pt_{10}B_{10}$, where x=0–8.

11. The magnetic recording medium as in claim 1, wherein: said non-magnetic substrate comprises a material selected from among Al, Al-based alloys, NiP-plated Al, other metals, other metal alloys, glass, ceramics, polymers, and composites and laminates thereof;

said non-magnetic seed layer (a) is from about 10 to about 500 Å thick and comprises an amorphous or fine-grained material selected from the group consisting of Ni—Al, Fe—Al, Cr—Ti, Cr—Ta, Ta, Ta—W, Ru—Al, Co—Ti, and Ta—N;

said at least one non-magnetic underlayer (b) is from about 30 to about 150 Å thick and comprises a polycrystalline material selected from Cr, Cr alloys, and $Cr/Cr_{100-x}M_x$ bi-layer structures, where M is a metal selected from W and V and $x \leq 15$;

said non-magnetic spacer layer (d) is from about 6 to about 15 Å thick and comprises a material selected from the group consisting of Ru, Rh, Ir, Cr, Cu, and their alloys; and said second ferromagnetic layer (e) is from about 100 to about 250 Å thick and comprises at least one layer of at least one ferromagnetic material selected from alloys of Co with at least one element selected from the group consisting of Pt, Cr, B, Fe, Ta, Ni, Mo, V, Nb, W, Ru, and Ge.

12. An anti-ferromagnetically coupled ("AFC"), high areal density magnetic recording medium of simplified thin film layer structure and having improved thermal stability and signal-to-medium noise ratio ("SMNR"), comprising a stack of thin film layers including, in overlying sequence from a surface of a non-magnetic substrate:

(a) a non-magnetic seed layer ("SDL");

(b) at least one non-magnetic underlayer ("UL");

(c) a first ferromagnetic layer ("$M_1$") positioned directly on said non-magnetic underlayer (b), said first ferromagnetic layer (c) comprises a first CoCrPtB alloy or a CoCrTa alloy;

(d) a non-magnetic spacer layer ("SPL");

(e) a second ferromagnetic layer serving as a magnetic recording layer ("$M_2$"); and (f) a third ferromagnetic layer ("$M_3$") positioned directly between said first ferromagnetic layer (c) and said non-magnetic spacer layer (d); wherein:

said first ferromagnetic layer (c) and said third ferromagnetic layer (f) serve as a combined interlayer ("IL") and "bottom" magnetic layer ("BML") and said non-magnetic spacer layer (d) provides RKKY-type coupling between said first ferromagnetic layer and said second and third ferromagnetic layers for stabilizing said medium via anti-ferromagnetic coupling (AFC) and improving said SMNR;

said non-magnetic substrate comprises a material selected from among Al, Al-based alloys, NiP-plated Al, other metals, other metal alloys, glass, ceramics, polymers, and composites and laminates thereof;

said non-magnetic seed layer (a) is from about 10 to about 500 Å thick and comprises an amorphous or fine-grained material selected from the group consisting of Ni—Al, Fe—Al, Cr—Ti, Cr—Ta, Ta, Ta—W, Ru—Al, Co—Ti, and Ta—N;

said at least one non-magnetic underlayer (b) is from about 30 to about 150 Å thick and comprises a polycrystalline material selected from Cr, Cr alloys, and $Cr/Cr_{100-x}M_x$ bi-layer structures, where M is a metal selected from W and V and $x \leq 15$;

said first ferromagnetic layer (c) is from about 30 to about 50 Å thick and comprises a $Co_{68+x+y}Cr_{16-x}Pt_{8-y}B_8$ alloy, wherein x=0–8 and y=0 or 1, or $CoCr_{14}Ta_4$;

said non-magnetic spacer layer (d) is from about 6 to about 15 Å thick and comprises a material selected from the group consisting of Ru, Rh, Ir, Cr, Cu, and their alloys; and said second ferromagnetic layer (e) is from about 100 to about 250 Å thick and comprises at least one layer of at least one ferromagnetic material selected from alloys of Co with at least one element selected from the group consisting of Pt, Cr, B, Fe, Ta, Ni, Mo, V, Nb, W, Ru, and Ge, wherein:

said third ferromagnetic layer ($M_3$) comprises $CO_{66+x}Cr_{14-x}Pt_{10}B_{10}$, where x=0–8, for providing further improvement in equalized SMNR, said third ferromagnetic layer (f) being from about 20 to about 40 Å thick, the combined thickness of said first ferromagnetic layer (c) and said third ferromagnetic magnetic layer (f) being less than that of said second ferromagnetic layer (e) and sufficiently small such that at zero external field the magnetic moments of both said first ferromagnetic layer (c) and said third ferromagnetic magnetic layer (f) point in a direction opposite to the magnetic moment of said second ferromagnetic layer (e).

13. A method of manufacturing an anti-ferromagnetically coupled ("AFC") magnetic recording medium comprising the steps of:
    (a) providing a non-magnetic substrate including at least one surface; and
    (b) forming on said at least one surface a stack of thin film layers comprising, in sequence from said at least one surface:
        (i) a non-magnetic seed layer ("SDL");
        (ii) at least one non-magnetic underlayer ("UL");
        (iii) a first ferromagnetic layer ("$M_1$") formed directly on said non-magnetic underlayer, said first ferromagnetic layer (iii) is from about 30 to about 50 Å thick and comprises a $Co_{68+x+y}Cr_{16-x}Pt_{8-y}B_8$ alloy, wherein x=0–8 and y=0 or 1, or $CoCr_{14}Ta_4$;
        (iv) a non-magnetic spacer layer ("SPL");
        (v) a second ferromagnetic layer serving as a magnetic recording layer ("$M_2$"); and
        (vi) a third ferromagnetic layer formed directly between said first ferromagnetic layer and said non-magnetic spacer layer; wherein:
    the combined thickness of said first ferromagnetic layer (iii) and said third ferromagnetic magnetic layer (vi) being less than that of said second ferromagnetic layer (v) and sufficiently small such that at zero external field the magnetic moments of both said first ferromagnetic layer (iii) and said third ferromagnetic magnetic layer (vi) point in a direction opposite to the magnetic moment of said second ferromagnetic layer (v).

14. The method according to claim 13, wherein:
    step (a) comprises providing a non-magnetic substrate comprising a material selected from among Al, Al-based alloys, NiP-plated Al, other metals, other metal alloys, glass, ceramics, polymers, and composites and laminates thereof; and
    step (b) comprises forming a stack of thin film layers comprising:
        (i) a non-magnetic seed layer from about 10 to about 500 Å thick and comprised of an amorphous or fine-grained material selected from the group consisting of Ni—Al, Fe—Al, Cr—Ti, Cr—Ta, Ta, Ta—W, Ru—Al, Co—Ti, and Ta—N;
        (ii) at least one non-magnetic underlayer from about 30 to about 150 Å thick and comprised of a polycrystalline material selected from Cr, Cr alloys, and $Cr/Cr_{100-x}M_x$ bi-layer structures, where M is a metal selected from W and V and x≦15;
        (iii) a non-magnetic spacer layer from about 6 to about 15 Å thick and comprised of a material selected from the group consisting of Ru, Rh, Ir, Cr, Cu, and their alloys; and
        (iv) a second ferromagnetic layer from about 100 to about 250 Å thick and comprised of one or more layers of at least one ferromagnetic material selected from alloys of Co with at least one element selected from the group consisting of Pt, Cr, B, Fe, Ta, Ni, Mo, V, Nb, W, Ru, and Ge.

15. A method of manufacturing an anti-ferromagnetically coupled ("AFC"), high areal density magnetic recording medium of simplified thin film layer structure and having improved thermal stability and signal-to-medium noise ratio ("SMNR"), comprising the steps of:
    (a) providing a non-magnetic substrate including at least one surface; and
    (b) forming on said at least one surface a stack of thin film layers comprising, in sequence from said at least one surface:
        (i) a non-magnetic seed layer ("SDL");
        (ii) at least one non-magnetic underlayer ("UL");
        (iii) a first ferromagnetic layer ("$M_1$") formed directly on said non-magnetic underlayer, said first ferromagnetic layer (iii) comprises a first CoCrPtB alloy or a CoCrTa alloy;
        (iv) a non-magnetic spacer layer ("SPL");
        (v) a second ferromagnetic layer serving as a magnetic recording layer ("$M_2$"); and
        (vi) a third ferromagnetic layer formed directly between said first ferromagnetic layer and said non-magnetic spacer layer; wherein:
    said first ferromagnetic layer (iii) and said third ferromagnetic layer (vi) serve as a combined interlayer ("IL") and "bottom" magnetic layer ("BML"), said non-magnetic spacer layer (iv) provides RKKY-type coupling between said first ferromagnetic layer and said second and third ferromagnetic layers for stabilizing said medium via anti-ferromagnetic coupling (AFC) and improving said SMNR,
    wherein: step (a) comprises providing a non-magnetic substrate comprising a material selected from among Al, Al-based alloys, NiP-plated Al, other metals, other metal alloys, glass, ceramics, polymers, and composites and laminates thereof; and
    step (b) comprises forming a stack of thin film layers comprising:
        (i) a non-magnetic seed layer from about 10 to about 500 Å thick and comprised of an amorphous or fine-grained material selected from the group consisting of Ni—Al, Fe—Al, Cr—Ti, Cr—Ta, Ta, Ta—W, Ru—Al, Co—Ti, and Ta—N;
        (ii) at least one non-magnetic underlayer from about 30 to about 150 Å thick and comprised of a polycrystalline material selected from Cr, Cr alloys, and $Cr/Cr_{100-x}M_x$ bi-layer structures, where M is a metal selected from W and V and x≦15;
        (iii) a first ferromagnetic layer from about 30 to about 50 Å thick and comprised of a $Co_{68+x+y}Cr_{16-x}Pt_{8-y}B_8$ alloy, wherein x=0–8 and y=0 or 1, or $CoCr_{14}Ta_4$;

(iv) a non-magnetic spacer layer from about 6 to about 15 Å thick and comprised of a material selected from the group consisting of Ru, Rh, Ir, Cr, Cu, and their alloys; and (v) a second ferromagnetic layer from about 100 to about 250 Å thick and comprised of one or more layers of at least one ferromagnetic material selected from alloys of Co with at least one element selected from the group consisting of Pt, Cr, B, Fe, Ta, Ni, Mo, V, Nb, W, Ru, and Ge; and step (b) comprises forming a third ferromagnetic layer (vi) comprising $CO_{66+x}Cr_{14-x}Pt_{10}B_{10}$, where x=0–8, for providing further improvement in equalized SMNR, said third ferromagnetic layer (vi) being from about 20 to about 40 Å thick, the combined thickness of said first ferromagnetic layer (iii) and said third ferromagnetic magnetic layer (vi) being less than that of said second ferromagnetic layer (v) and sufficiently small such that at zero external field the magnetic moments of both said first ferromagnetic layer (iii) and said third ferromagnetic magnetic layer (vi) point in a direction opposite to the magnetic moment of said second ferromagnetic layer (v).

* * * * *